US007139978B2

(12) United States Patent
Rojewski et al.

(10) Patent No.: US 7,139,978 B2
(45) Date of Patent: Nov. 21, 2006

(54) RECORDING USER INTERACTION WITH AN APPLICATION

(75) Inventors: Erwin Rojewski, Karlsruhe (DE); Andreas Roessler, Sulzfeld (DE)

(73) Assignee: SAP AG, Walldorf (DE)

( * ) Notice: Subject to any disclaimer, the term of this patent is extended or adjusted under 35 U.S.C. 154(b) by 698 days.

(21) Appl. No.: 10/188,300

(22) Filed: Jul. 1, 2002

(65) Prior Publication Data

US 2003/0164850 A1 Sep. 4, 2003

Related U.S. Application Data

(60) Provisional application No. 60/360,776, filed on Mar. 1, 2002.

(51) Int. Cl.
*G06F 17/00* (2006.01)
*G06F 3/00* (2006.01)
(52) U.S. Cl. .................. 715/744; 715/738; 715/746; 715/748
(58) Field of Classification Search ........ 715/733–750, 715/855, 704, 705, 712, 714
See application file for complete search history.

(56) References Cited

U.S. PATENT DOCUMENTS

| 5,781,909 | A | * | 7/1998 | Logan et al. ............... 707/200 |
| 5,931,912 | A | * | 8/1999 | Wu et al. ................... 709/224 |
| 6,113,645 | A | * | 9/2000 | Benitz et al. ................ 703/22 |
| 6,134,590 | A | * | 10/2000 | Perlman ..................... 709/228 |
| 6,253,253 | B1 | * | 6/2001 | Mason et al. ............... 719/315 |
| 6,332,147 | B1 | * | 12/2001 | Moran et al. ............. 715/500.1 |
| 6,360,332 | B1 | * | 3/2002 | Weinberg et al. ............. 714/4 |
| 6,549,216 | B1 | * | 4/2003 | Schumacher et al. ....... 715/704 |
| 6,631,345 | B1 | * | 10/2003 | Schumacher et al. ......... 703/22 |
| 6,757,900 | B1 | * | 6/2004 | Burd et al. ................. 719/316 |
| 6,785,369 | B1 | * | 8/2004 | Diamond et al. ........ 379/88.22 |
| 6,801,908 | B1 | * | 10/2004 | Fuloria et al. ................. 707/3 |
| 2002/0065912 | A1 | * | 5/2002 | Catchpole et al. .......... 709/224 |
| 2002/0138624 | A1 | * | 9/2002 | Esenther ..................... 709/227 |

(Continued)

FOREIGN PATENT DOCUMENTS

EP 0 969 365 A 1/2000

(Continued)

OTHER PUBLICATIONS

Paganelli et al.: "Intelligent Analysis Of User Interactions With Web Applications", Proceedings of Intelligent User Interfaces, Jan. 13-16, 2002, San Francisco, CA USA.

(Continued)

*Primary Examiner*—Tadesse Hailu
(74) *Attorney, Agent, or Firm*—Mintz, Levin, Cohn, Ferris, Glovsky and Popeo, P.C.

(57) ABSTRACT

Methods and apparatus, including computer program products, for processing a user interaction with an application, such as a browser-based application. A user interaction with the browser-based application is detected at a software framework. The browser-based application is executing in a browser at a local computer system. The user interaction is processed at the software framework, where processing includes determining whether the user interaction can be handled locally or requires access to a resource at a remote computer system. The user interaction is processed based on a result of the determination. A data item representative of the user interaction can be created at the software framework and stored at a data store. The data item can later be retrieved and the user interaction represented by the data item reprocessed at the software framework to replay the user interaction.

78 Claims, 5 Drawing Sheets

U.S. PATENT DOCUMENTS

| | | | |
|---|---|---|---|
| 2002/0147570 A1* | 10/2002 | Kraft et al. | 702/186 |
| 2002/0165954 A1* | 11/2002 | Eshghi et al. | 709/224 |
| 2002/0165993 A1* | 11/2002 | Kramer | 709/315 |
| 2003/0053420 A1* | 3/2003 | Duckett et al. | 370/252 |
| 2003/0115572 A1* | 6/2003 | Zondervan et al. | 717/109 |
| 2003/0142122 A1* | 7/2003 | Straut et al. | 345/704 |
| 2003/0189593 A1* | 10/2003 | Yarvin | 345/762 |
| 2004/0100507 A1* | 5/2004 | Hayner et al. | 345/855 |

FOREIGN PATENT DOCUMENTS

| | | |
|---|---|---|
| WO | 00 75814 A | 12/2000 |
| WO | WO 01/16783 A2 * | 3/2001 |
| WO | WO 01/16791 A2 * | 3/2001 |
| WO | WO 01/95104 A1 * | 12/2001 |

OTHER PUBLICATIONS

Symantec pcAnywhere, *Symantec pcAnywhere User's Guide*, Documentation version 105.1, 1995-2002, pp. 11-14, 41-72 and 113-120.

Mercury Interactive, "Mercury Interactive Minimizes Infrastructure Costs with Advanced Load and Functional Testing Solutions", Screaming Media, PR Newswire San Francisco, Mar. 13, 2001 (3 pages).

"The Complete Testing Solution for SAP R/3", www.mercuryinteractive.com, downloaded from www.archive.org, archived Mar. 1, 2001 (19 pages).

"The Complete Testing Solution for Java-based Applications—PDF Version", www.mercuryinteractive.com, downloaded from www.archive.org, archived Mar. 1, 2001 (9 pages).

Mercury Interactive, "Mercury Interactive Announces WinRunner for R/3 with QuickTest Technology to Simplify and Accelerate Testing of SAP R/3 Applications", Press Release, Mar. 1, 1999 (3 pages).

"WinRunner® 6, Powerful Test Automation for the Enterprise", www.mercuryinteractive.com, downloaded from www.archive.org, archived Oct. 18, 2000 (2 pages).

Compuware Corporation, "TestPartner Product Detail", Web site at www.compuware.com/products/qacenter/testpartner/detail.htm, 2002 (2 pages).

David Pogue, "Macros put the function back in function keys", Macroworld, Web site at www.macworld.com/1995/03/secrets/451.html, Mar. 1995 (4 pages).

CATT Tutorial: Easy Mode—Computer Aided Test Tool, excerpt from CD Rom entitled "Mini SAP Basis CD1", Galileo Press, 2001 (55 pages).

CATT: Computer Aided Test Tool, excerpt from CD Rom entitled "Mini SAP Basis CD1", Galileo Press, 2001, pp. 1-19.

CATT: Computer Aided Test Tool Easy Mode: Creating Test Cases in Easy Mode, excerpt from CDRom entitled, "Mini SAP Basis CD1", Galileo Press, 2001, pp. 1-8.

CATT: Enhanced Mode, excerpt from CDRom entitled "Mini SAP Basis CD1", Galileo Press, 2001, pp. 1-91.

Compuware Corporation, "Compuware Announces Next Generation Automated Testing Solution for Web and Distributed Applications", Web site at www.compuware.com/pressroom/news/2000/2000060502.htm, downloaded Aug. 29, 2002 (3 pages).

\* cited by examiner

RECORDING USER INTERACTION WITH AN APPLICATION

CROSS REFERENCE TO RELATED APPLICATIONS

This application claims priority to U.S. provisional application Ser. No. 60/360,776, filed Mar. 1, 2002, the disclosure of which is incorporated by reference.

BACKGROUND

This application relates to recording interactions with an application, for example, a browser-based application such as a search engine, a reservation system provided by an airline's website, or an e-commerce application provided by a vendor's website.

An interaction with a browser-based application executing on a browser at a client computer, typically requires transmissions to and from a server connected to the client computer, for example, by an Internet connection, dial-up connection or the like. A slow transmission rate can result in a slow and tedious interaction with the application. Reducing the number of transmissions required to interact with the application can therefore improve the user experience and potentially the performance of the application.

Recording a user's interaction with an application can be useful, for example, to test a system. Using test data as input, the interaction with an application can be recorded and reviewed to learn about the system's behavior in response to the test input. Recording tools typically require installation on the operating system of computer on which the application is executing. A recording tool may be application specific and dependent on proprietary technology used to create the application. A recording tool used in conjunction with a browser-based application may only capture the stream transmitted between the client computer and the server, thus, for example, not allowing for the system's behavior outside of this stream to be analyzed with test data.

SUMMARY

Methods and apparatus, including computer program products, for processing a user interaction with an application, such as a browser-based application, include detecting at a software framework a user interaction with the browser-based application. The browser-based application is executing in a browser at a local computer system. The user interaction is processed at the software framework, where processing includes determining whether the user interaction can be handled locally or requires access to a resource at a remote computer system. The user interaction is processed based on a result of the determination.

Embodiments may include one or more of the following. Processing the user interaction based on a result of the determination can include one or both of: handling the user interaction locally at the software framework executing on the local computer system, or sending a request to the more computer system to handle the user interaction. A user interaction that can be processed locally is a user interaction that can be handled without accessing a resource at a remote computer system. A data item can be created representative of the user interaction, and the data item stored at a data store. The steps of detecting a user interaction, processing a user interaction and creating a data item representative of the user interaction can be repeated for each user interaction with the browser-based application during a user-delineated session.

The data item representative of the user interaction can be retrieved from the data store. The data item can be used to reprocess the user interaction represented by the data item at the software framework, including determining if the user interaction can be handled locally or requires access to a resource at a remote computer system, and reprocessing the user interaction based on a result of the determination.

The browser-based application can be executing on a browser at a second computer system that also has access to the data store. The second computer system can retrieve the data item from the data store and use the data item to reprocess a user interaction represented by the data item at a software framework at the second computer system. Reprocessing at the second computer system includes determining if the user interaction represented by the data item can be handled locally or requires access to a resource at a remote computer system, and reprocessing the user interaction based on a result of the determination.

The second computer system can periodically poll the data store for one or more data items not previously retrieved by the second computer system and retrieve from the data store such data items. In another embodiment, the second computer system can maintain a connection to the data store, such that the second computer system retrieves a data item from the data store as soon as the data item is received at the data store from the local computer system.

If a plurality of data items are created, then a batch of data items from the plurality can be collected and transmitted to the data store together. The data store can be a database. A data item can include a sequence of one or more object-event pairs. The software framework executing at both the local computer system and the second computer system can be a program such as a JavaScript program, Java program or VBScript program. The software framework can be loaded into the browser from a web server, included in the browser-based application, included in the browser or installed on the local computer system. The remote computer system can be a web server in communication with the local computer system by an Internet connection.

In general, in another aspect, methods and apparatus, including computer program product claims, for recording user interaction with a browser-based application include the following. Detecting in a software framework executing in a browser at a local computer system that a user has initiated an interaction with a browser-based application executing in the browser. The user interaction is processed in the software framework, where processing includes handling the user interaction locally or sending a request to a remote server if required for processing. A data item is created at the software framework representative of the user interaction and the data item is recorded at a data store.

Embodiments can include one or more of the following. The steps of detecting, creating and recording can be repeated for each user interaction with the browser-based application during a user-delineated session. Data items can be retrieved from the data store representative of the user interaction with the browser-based application during the user-delineated session. The retrieved data items can be processed at the software framework to replay the user interactions with the browser-based application during the user-delineated session.

In general, in another aspect, methods and apparatus, including computer program product claims, for recording user interaction with a browser-based application include the following. Detecting in a software framework executing in a browser at a local computer system that a user has initiated an interaction with a browser-based application executing in the browser. One or more data items representative of the user interaction are created at the software framework and recorded at a data store.

Embodiments can include one or more of the following. The data item can be an object-event pair. The data item can be descriptive of the user's interaction with the browser-based application in the browser, such that a data stream resulting from the user interaction at a browser level and at a remote server level is captured by the data item. The data items can be retrieved from the data store and processed at the software framework to replay the user interaction with the browser-based application represented by the data item. Replaying the user interaction can include determining whether the data item can be handled locally or requires a request to a remote server for processing and processing the data item according to a result of the determination.

In general, in another aspect, methods and apparatus, including computer program product claims, for listening to a user interaction with a browser-based application include the following. Detecting in a software framework executing at a first computer system that user has initiated an interaction with a browser-based application executing in a browser. The user interaction is processed at the software framework and one or more data items representative of the user interaction are created. The data items are recorded at a data store accessible by the first computer system and by a second computer system on which another instance of the browser-based application is executing in a browser. The data items are retrieved from the data store and processed at a software framework executing in the browser at the second computer system to listen at the second computer system to the user interaction with the browser-based application at the first computer system.

Embodiments can include one or more of the following. The second computer system can periodically poll the data store for one or more data items not previously retrieved by the second computer system, and such data items can be retrieved. The second computer system can maintain a connection to the data store such that the second computer system can retrieve a data item from the data store as soon as the data item is received at the data store from the first computer system. In one embodiment, the user of the first computer system can be a customer, and a user of the second computer system can be a customer support worker for the browser-based application. The customer support worker can listen to the customer's interaction with the browser-based application to provide customer support to the customer.

In general, in another aspect, methods and apparatus, including computer program product claims, for simulating user interaction with a browser-based application include the following. A plurality of data items representative of user interaction with a browser-based application are received. The data items are processed using a software framework, such that the user interactions with the browser-based application represented by the data items are simulated. Processing the data items includes using the software framework to determine whether a user interaction represented by the data item can be handled locally or requires access to a resource at a remote computer system, and processing the user interaction based on a result of the determination.

Embodiments can include one or more of the following. The plurality of data items can be included in a batch input file. The browser-based application can be an application for loading data extracted from a first system into a second system, and processing the data items using the software framework can load the data extracted from the first system into the second system. In another embodiment, the data items can be received by a customer support worker for the browser-based application and the customer support can be provided based on the simulated user interactions with the browser-based application.

Embodiments can be implemented to realize one or more of the following advantages. By using the software framework in conjunction with a browser-based application executing on a client computer, user interaction is processed locally at the client computer if possible, thereby reducing the number of transmissions between the client computer and the server. Reducing the required transmissions can increase the speed of interaction with the application, and enhance the user experience.

The software framework can record a user's interaction with an application and play back the recording, such that the user's interaction with the application is simulated. Replaying the user interaction—just as if the user were interacting a second time with the application—is useful for executing test data to test capabilities at both the browser and server levels. The recordation feature can also be used to create macros to streamline user interaction with an application. A second client computer can play back the recording, which can occur nearly simultaneously with the original user interaction from which the recording is created, thereby allowing a remote second client computer to "listen" to the user interaction at the originating client computer.

The software framework can be implemented using non-proprietary language, and therefore can execute on most browsers and is independent of the programming language and/or technology used to create a browser-based application that supports the software framework. Because the software framework can execute on the browser, it is unnecessary to install a recording tool on the client computer, for example, at the operating system level. A data stream at the browser level and at the server level, including browser-server transmissions, can be captured by the recordation feature.

The details of one or more embodiments are set forth in the accompanying drawings and the description below. Other features and advantages will be apparent from the description and drawings, and from the claims.

DRAWING DESCRIPTIONS

Like reference symbols in the various drawings indicate like elements.

DETAILED DESCRIPTION

Figure 1:
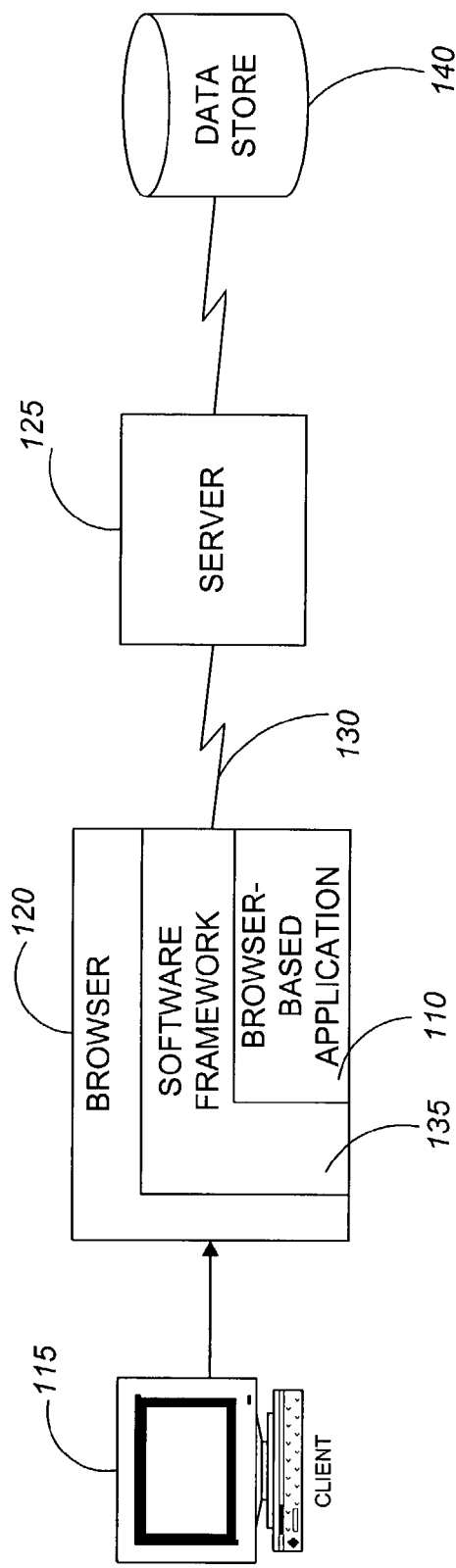
FIG. 1 is a schematic representation of a system for recording interactions with a browser-based application.

User interaction with a browser-based application 110 (e.g. a search engine, a portal, a transactional e-commerce website, etc.) executing in a browser 120 typically requires transmissions between a client computer 115 hosting the browser 120 and a server 125. These transmissions may serve to exchange data between the client computer 115 and the server 125, for example, to read or write data from/to a data store 140. Communication between the client computer 115 and the server 125 is facilitated by a network connection 130, such as the Internet, an intranet, extranet or other LAN or WAN. Transmissions between the client computer 115 and the server 125 can be slow and tedious, for a number of reasons, including a slow transmission medium, high transmission traffic and/or transmission of large amounts of data. Reducing the number of transmissions required between the client computer 115 and the server 125 can improve the speed with which a user can interact with the browser-based application 110, thus improving the user's experience.

By making a determination before a server request is generated from a user interaction as to whether or not the user interaction can be handled locally, and handling it locally if possible, the number of requests transmitted between the client computer 115 and the server 125 can be reduced. User interactions with the browser-based application 115 can be channeled through a software framework 135 that is capable of making a determination as to whether a user interaction can be handled locally. If a user interaction can be handled locally, the software framework 135 processes the interaction. If a user interaction cannot be handled locally, i.e. a request to the server 125 is required, then a request is generated and transmitted. The software framework 135 can be an application included with a browser, or can be loaded from a server into the browser. Alternatively, the software framework 135 can come packaged with the browser-based application 110. In another alternative, the software framework 135 can be installed on the client computer 115. The software framework 135 can be used in conjunction with a browser-based application that supports (i.e. is designed or modified to work with) the software framework 135.

The software framework 135 behaves as a software layer between the browser-based application 110 and the browser 120. In the absence of the software framework 135, a user interaction, such as activating an icon displayed on an HTML page included in the browser-based application, typically results in a request being sent from the browser 120 to the server 125. If the browser-based application 110 supports the software framework 135, which is present in the browser 120, then a user interaction first calls program code in the software framework 135.

Figure 2:
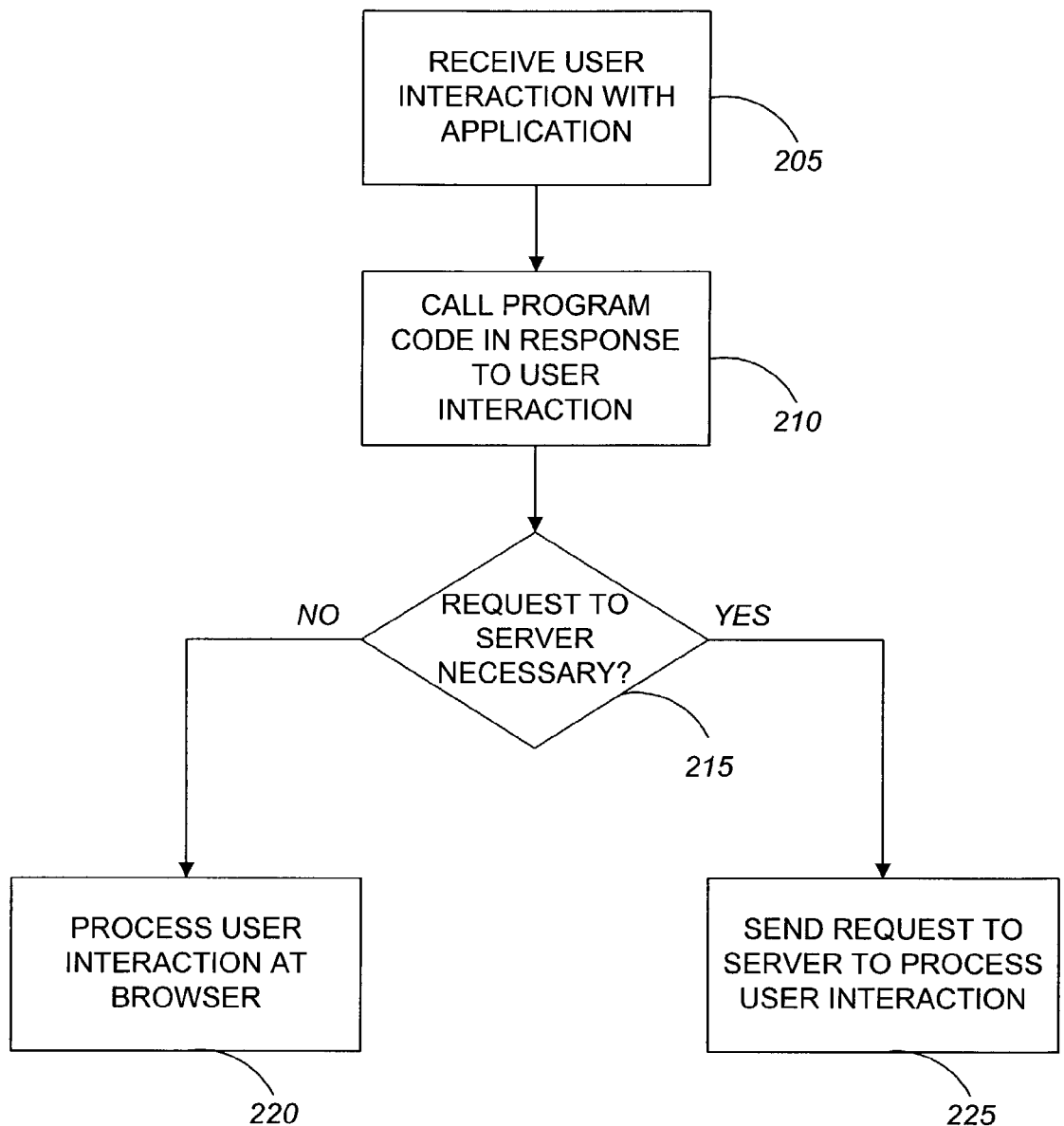
FIG. 2 is a flowchart for processing a user interaction with a browser-based application.

For example, referring to FIG. 2, if the user interaction involved entering numbers in a date field (Step 205), then program code in the software framework 135 capable of performing relevant plausibility checks is called (Step 210). If the user interaction can be handled within the browser 120 by the software framework 135, without requiring a request to the server 125 ('Yes' branch of decision step 215), then the interaction is processed (Step 220). If the user interaction included a request for data from a remote database, such as the selection of a telephone number from a directory, then program code called in the software framework 135 would generate and transmit a request to the server 125, such that the server 125 could process the user interaction (Step 225). Therefore, by channeling user interactions with the browser-based application through the software framework 135, the number of transmissions between the client computer 115 and the server 125 can be reduced.

In one implementation, the software framework 135 can be a JavaScript framework and the program code called in response to a user action can be a JavaScript function. One example of a JavaScript framework is described in the U.S. patent application Ser. No. 10/094,692, for "A JavaScript Client Framework", filed on Mar. 11, 2002, by Dencker et al, the entire contents of which are incorporated herein by reference. In other implementations, the software framework 135 can be implemented using languages such as Java, VBScript, or the like.

In an implementation where the software framework 135 is a JavaScript framework, a user interaction, such as activating a button or icon on a web page in a browser-based application supporting the JavaScript framework, calls a JavaScript function of the JavaScript framework. The function executes to process the interaction, which as described above may involve handling the interaction locally (e.g. performing checks) or sending a request to the server 125. For each user interaction, an event is sent to the JavaScript framework. The JavaScript framework knows to which object (e.g. field, button, etc.) the event is related, and therefore an object-event pair represents the user interaction. An object is described in such a pair by the object's position in the complete hierarchy of all objects of a web page. A web page can be a page created from HTML, HTMLB, WML or the like.

The hierarchy can be described by a notation as follows. Consider objects that are input fields or links. By way of example, a third input field of a second field group of a first frame of a web page can be described in a notation as Frame1.Fieldgroup2.Field3. The event that was triggered for the object is identified by a unique ID, such as a name or description of the event. The event ID is saved. It is also possible to save parameters for the event that characterize the event in more detail. Such parameters can be necessary, for example, to specify events such as keystrokes, in more detail. An example of such an event, where the key "K" has been pressed, is Keypress(K), where the "K" specifies the event "Keypress" in more detail.

Different object/event pairs can be distinguished by a separator character, such as a semi-colon. In this manner, a string is created including the actions triggered by the user in the browser in serialized form. For example, if both letters "A" and "B" are entered in field number 3 of the first frame of the web page and the focus in the frame set to field number 2, the process can be described by the following string:

Frame1.Fieldgroup2.Field3 Keypress(A);
        Frame1.Fieldgroup2.Field3 Keypress(B);

Frame1.Fieldgroup2.Field2 SetFocus

Because only a list of objects and associated events is stored in the data store 140, it is possible to keep the data volume that is necessary to record complex business processes to a minimum. This is particularly the case if the data is compressed using a suitable JavaScript program before saving in a data store. Despite the insignificant data volume, it is nevertheless possible to completely record the setting of each focus in a window, the selection of each function and the clicking of each link.

Therefore, a data item can be used to represent a user interaction. In one implementation, as described above, the data item can be an object-event pair and one or more data items can be included in a string. However, other implementations are possible, and different notations can be used to represent a user interaction.

Recording and storing data items representing user actions can be used to record a user interaction with the browser-based application 110. For example, in a "recording mode", user interactions can be processed by the browser-based application 110 and software framework 135 as described above, and data items representing the user interactions can be forwarded to a data store for storage. In one implementation the data store can be a remote data store 140 accessible by the server 125 (see FIG. 1). The data items can be transmitted to the server 125 for storage in the data store 140. The data store 140 can be a file system or a database management system. In other implementations, the data store can be local to the client computer 115, or a remote data store accessible directly by the client computer 115.

By channeling user interaction with the browser-based application 110 through the software framework 135, and storing data items generated by the software framework 135 representing the user interaction, actions of the user can be saved and the flow of the user's interaction with the browser-based application 110 can be recorded. For efficiency when recording, a certain amount of data items can be collected and then written to the data store 140 at the same time as a batch.

An existing recording later can be retrieved from the data store 140 by the software framework 135, and the data items representative of user interactions included in the recording re-processed by the software framework 135, thereby replaying the user's interaction with the browser-based application 110. For example, the software framework 135 can access the data store 140 via the server 125, and retrieve data items representing a user's interaction. By processing the data items through the software framework 135, the original user actions from which the data items were created are simulated, and are processed by the software framework 135 in exactly the same way as the original user actions. That is, the same program code is called, such as JavaScript functions if the software framework 135 is a JavaScript framework, and the same steps taken to process the user action, including sending the same requests to the server 125. As such, the user's interaction with the browser-based application 110 is replayed step-by-step in the same order as the original user interaction.

User actions are recorded at the browser level by the software framework 135, rather than at the operating system or application level for example. The actual recording and transfer of recorded data items can thereby exclusively use common Internet technologies, without dependency on a proprietary technology of a particular manufacturer. By using a non-proprietary language, such as JavaScript, Java or VBScript, to implement the software framework 135, the software framework 135 can execute on most browsers, and is independent of the programming language and/or technology used to create the browser-based application 110. The software framework 135 is therefore not application-specific. In addition, because the software framework 135 can execute on the browser 120, it is unnecessary to install a recording tool on the client computer, for example at the operating system level, and the software framework 135 can leave zero footprint once the browser 120 is closed.

An advantage of recording user interaction with a browser-based application at the browser level, is the ability to test not only the server capabilities using test data, but to test capabilities at the browser level as well. That is, by recording both actions within the browser (i.e. user input to the browser-based application) and requests between the browser and server, both the browser and server capabilities can be tested.

Another use for the recording mode is the creation of user-specific macros. For example, a user that routinely uses the browser-based application 110 may also routinely make a number of the same entries and take a number of the same actions, referred to hereinafter simply as "repetitive actions", before making a data entry that varies each time the user runs the application 110. By recording the repetitive actions and associating them with an identifier, such as a macro name, a user can choose instead to replay the repetitive actions from an earlier interaction with the browser-based application, and thus eliminate the need for the user to repeat the repetitive actions time after time. For example, the repetitive actions can be stored as a macro represented on a user interface by an icon, or a button on a toolbar. By activating the icon, the software framework 135 accesses the data store 140 via the server 125, and retrieves data items representing the repetitive actions (See FIG. 1). The data items are reprocessed by the software framework 135, thereby replaying the repetitive actions. Alternatively, the repetitive actions can be recorded as a macro delivered with the browser-based application 110, for example, to simplify standard processes in a system, or to simplify generation of test data in a test system.

By way of example, a user could record his or her interactions with a transactional website, such as a tabbing between data fields and/or jumping to new screens, to enter name, billing address information, shipping address information, credit card number and the like into the corresponding fields. This recorded interaction could be represented and made available to the user as a graphical user interface abstraction, such as a Replay button. The data items representing the interaction could be stored locally on a client computer, or remotely at a server used to access the transactional website. The next time the user was to interact with that same (or similar) e-commerce website, the user could simply click the Replay button, and the previously recorded interaction would be replayed, thereby automatically filling in the fields for name, billing and shipping address, credit card number, etc. Moreover, this functionality not only enhances convenience and efficiency, but also potentially data privacy and security, since the user need not store his or her personal data on a remote web server associated with the transactional e-commerce website.

The recording mode also can be used to record user actions across more than one browser-based application. For example, within a browser, a user might access a search engine (a first application), use the search engine to locate a web-site for a vendor, select a link to point the browser to the vendor's web-site (a second application), and perform an e-commerce transaction with the vendor at the vendor's web-site. In this example, at least two browser-based applications were accessed by the user at the browser. If the software framework 135 is available on the browser and supported by each application accessed by the user, or otherwise available through each application accessed by the user, then data items representing the user's actions can be generated and stored, to record the user's interaction with the applications. A user then can choose to retrieve and replay the recording, for example, to perform the same e-commerce transaction again at a later date.

In one implementation, a user could employ a "web-recording service" to record a macro for the user's interaction with one or more applications, that could later be accessed by the user from the web-recording service. In this implementation, data items representing the user's interaction with the browser-based applications are sent by the one or more software frameworks executing with the browser-based applications to the web-recording service for storage. The web-recording service can then package the data items into a macro for subsequent use by the user, which macro can be made available to the user, for example, by way of the web-recording service's website, or by e-mail.

In another implementation, the software framework 135 can be used when importing batch input into a system, to simplify system installation and the creation of test or productive data. For example, a user installing a new system, such as a database, typically must import data from an existing system into the new database. If the existing system and new database are not compatible, then a batch input file must be built that includes data extracted from the existing system and that is in a format acceptable to the new database. A batch input file can be formatted such that the data is included in data items representative of user interactions with a browser-based application (the "loading application") used to load the data extracted from the existing system into the new database. So long as the loading application used to the load the extracted data (included in the batch input file) into the new database supports the software framework 135, the software framework 135 can be used to process the batch input file. Processing the batch input file through the software framework 135, while using the loading application to load the batch input file into the new database, simulates manual entry of the data extracted from the existing system into the new database. In this way, local checks that can be performed by the software framework 135 and checks that require requests to a server are executed—just as would be executed if the data were manually input into the loading application—thus providing consistency of the data input into the new database.

Figure 3:
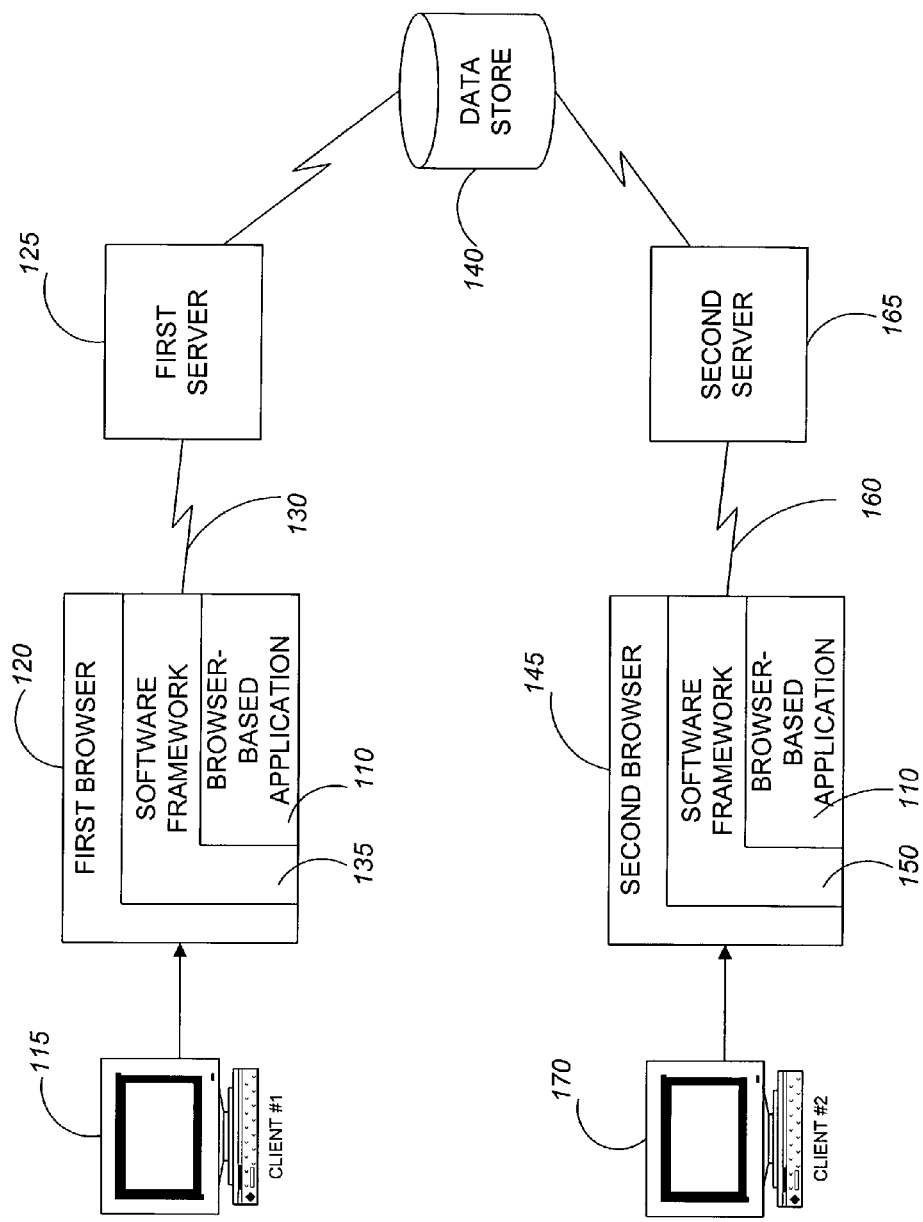
FIG. 3 is a schematic representation of a system for recording and replaying interactions with a browser-based application.

Referring to FIG. 3, the data store 140 can be accessible by a second browser 145 via a software framework 150 executing in the second browser 145. In the configuration shown, a second client computer 170 hosts the second browser 145, and is connected by a network connection 160 to a second server 165. The second server 165 has access to the data store 140. This configuration allows for the second browser 145 to be in a "listening mode" in relation to user interaction with the browser-based application 110 in the first browser 120.

Figure 4:
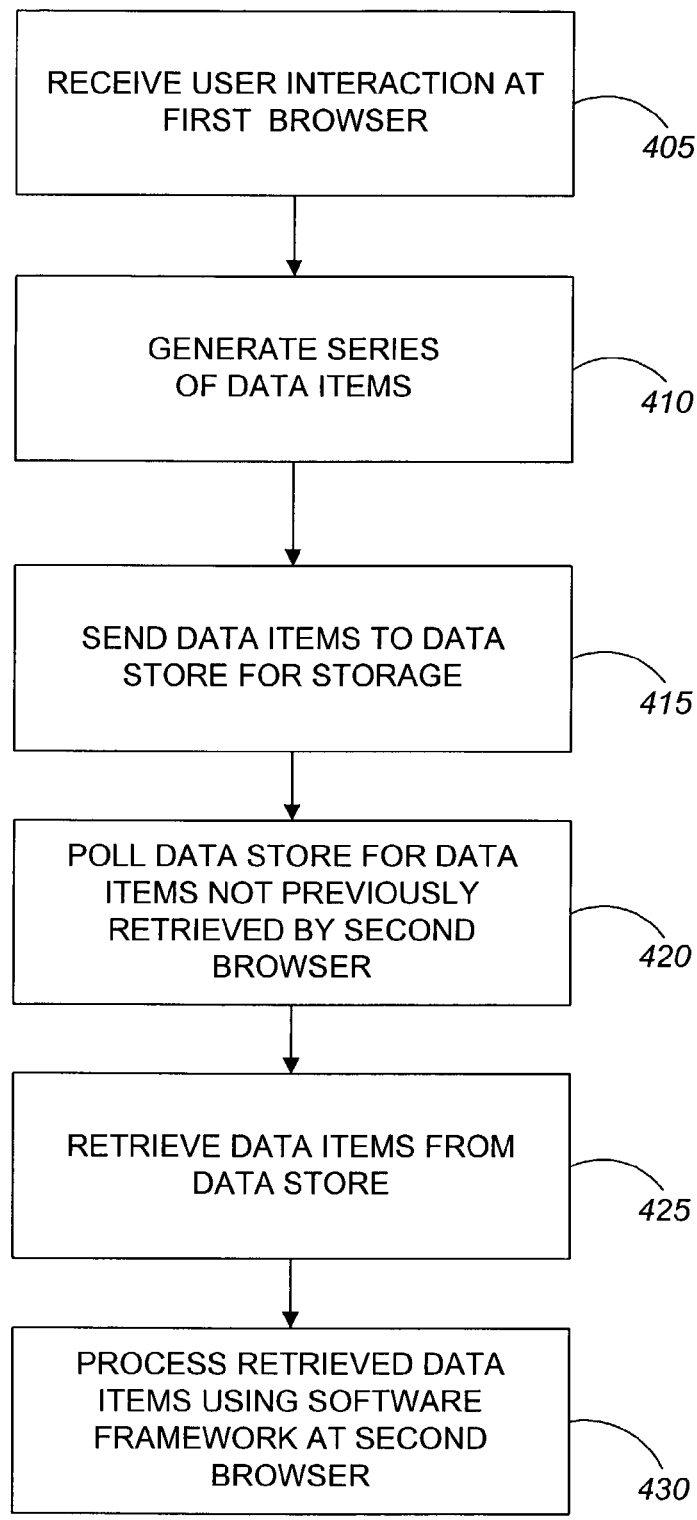
FIG. 4 is a flowchart for a process for recording and replaying interactions with a browser-based application.

Referring to FIG. 4, the following example demonstrates a use for the "listening mode." User actions with the browser-based application 110 are received in the first browser 120 (Step 405). The software framework 135 creates a series of data items representing the user actions (Step 410). The data items are sent to the data store 140 for storage (Step 415). The second software framework 150 running in the second browser 145 periodically polls the data store 140 for data items not previously retrieved by the second browser 145 (Step 420). Because the data items are not available to the second software framework 150 until they have been transmitted by the first client computer 115 to the data store 140, the first software framework 135 might batch data items created every few seconds, for example, and send them to the data store 140, so as to minimize the delay between a user action in the first browser 120 and the availability of the corresponding data item in the second software framework 150.

The second software framework 150 retrieves data items from the data store 140 representing the user interaction with the browser-based application in the first browser 120 (Step 425). Because the second software framework 150 and the browser-based application 110 are also executing on the second browser 145, the data items can be processed by the software framework 150, and the user interaction with the browser-based application 110 in the first browser 120 thereby replayed in the second browser 145 (Step 430). In this way, a user of the second client computer 170 can experience the first user's interaction with the browser-based application 110, as if looking over the shoulder of the first user, even though the second user may be at a remote location.

In the above example, alternative configurations are possible. For example, both client computers 115, 170 can be connected to the same server, such as server 125. Alternatively, the data can be stored in a remote data store that is accessible directly by both the first and second client computers 115, 170, in which case the second software framework 150 can retrieve the data from the data store without connecting through the second server 165. Other convenient configurations can also be used.

Simultaneous recording and relaying of a user interaction with the browser-based application, i.e. the listening mode, can be implemented using another approach. In this implementation, a permanent connection is maintained between the second server 165 and the second client computer 170. The second software framework 150 therefore can be informed immediately if new data items have been received at the data store 140, due to further user action in the first browser 120. The software framework 150 running in the second browser 145 establishes a connection to the second server 165 by sending a request to the second server 165. The second server 165 reacts to the request by constantly sending data retrieved from the data store 140 to the second browser 145. The data stream retrieved by the second server 165 and sent to the second browser 145 is constantly being processed in the second browser 145 by the software framework 150.

Figure 5:
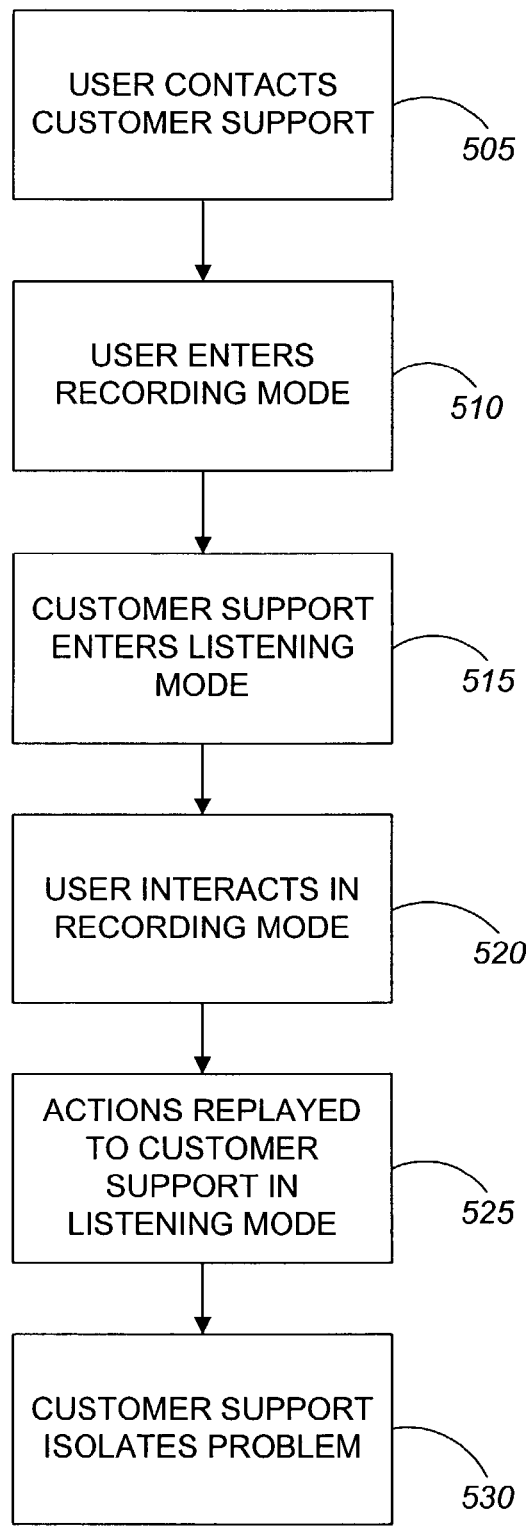
FIG. 5 is a flowchart for a process for listening at a remote client computer to a user's interactions with a browser-based application.

The listening mode can be used for customer support of the browser-based application 110. Referring to FIGS. 3 and 5, a user of the browser-based application 110, executing in the first browser 120 who is experiencing difficulty contacts customer support for the browser-based application, for example, by email or telephone (Step 505). A customer support worker instructs the user to enter recording mode (Step 510). At the same time, the customer support worker enters listening mode, with respect to the browser-based application 110 executing at the first browser 120 (Step 515). The user then interacts with the browser-based application 110 (Step 520), while the customer support worker "listens" to the interactions, by retrieving data items from the data store, representing the user's actions, relaying the data items to the software framework 150 at the second browser 145, and processing the data items in the software framework 150 (Step 525). The customer support worker can therefore see how the user is interacting with the browser-based application 110, and how the application 110 is behaving in response to the user input. The customer support worker can use this information to isolate and solve the user's problem (Step 530).

Alternatively, in the above example, the customer support worker might instruct the user to enter listening mode, while the customer support worker enters recording mode. In this way, the user can be trained how to interact with the browser-based application 110 by watching the customer support worker's interaction with the application 110 replayed step-by-step in the user's browser 120. In another alternative, the user can send data items representing the user's recorded interactions to the customer support worker in a file using email. This implementation would be useful in the case of a customer support desk accessible by email, which is retrieved and responded to by a customer support worker at a later time.

The computational aspects described here can be implemented in digital electronic circuitry, or in computer hardware, firmware, software, or in combinations of them. Where appropriate, aspects of these systems and techniques can be implemented in a computer program product tangibly embodied in a machine-readable storage device for execution by a programmable processor; and method steps can be performed by a programmable processor executing a program of instructions to perform functions by operating on input data and generating output.

To provide for interaction with a user, a computer system can be used having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments have been described. Nevertheless, it will be understood that various modifications may be made. For example, the steps described can be performed in a different order and still achieve desirable results. Accordingly, other embodiments are within the scope of the following claims.

The invention claimed is:

1. A computer-implemented method for processing a user interaction, the method comprising:
   detecting at a software framework a user interaction with a browser-based application executing in a browser at a local computer system;
   processing the user interaction at the software framework, the processing including:
      determining whether the user interaction can be handled locally or requires access to a resource at a remote computer system, and
      processing the user interaction based on a result of the determination;
   creating at least one data item representative of the user interaction, wherein the data item includes the result of the determination; and
   storing the data item at a data store.

2. The method of claim 1, wherein processing the user interaction based on a result of the determination includes one or both of:
   handling the user interaction locally at the software framework executing on the local computer system, and
   sending a request to the remote computer system to handle the user interaction.

3. The method of claim 1, further comprising:
   repeating the detecting a user interaction, processing a user interaction and creating a data item representative of a user interaction for each user interaction with the browser-based application during a user-delineated session.

4. The method of claim 1, further comprising:
   retrieving the data item from the data store; and
   using the retrieved data item to reprocess the user interaction represented by the data item at the software framework, including,
      determining if the user interaction represented by the data item can be handled locally or requires access to a resource at a remote computer system, and
      reprocessing the user interaction based on a result of the determination.

5. The method of claim 1, wherein the browser-based application is executing on a browser at a second computer system and the data store is accessible by the second computer system, the method further comprising:
   retrieving the data item from the data store; and
   using the retrieved data item to reprocess a user interaction represented by the data item at a software framework at the second computer system, including,
      determining if the user interaction represented by the data item can be handled locally or requires access to a resource at a remote computer system, and
      reprocessing the user interaction based on a result of the determination.

6. The method of claim 5, further comprising:
   periodically polling the data store for one or more data items not previously retrieved by the second computer system and retrieving from the data store such data items.

7. The method of claim 5, wherein:
   the second computer system maintains a connection to the data store, such that the second computer system retrieves a data item from the data store as soon as the data item is received at the data store from the local computer system.

8. The method of claim 1, wherein:
   a plurality of data items are created; and
   storing the data items further includes collecting a batch of data items from the plurality of data items and transmitting the batch of data items to the data store.

9. The method of claim 1, wherein the data store is a database.

10. The method of claim 1, wherein a data item includes a sequence of one or more object-event pairs.

11. The method of claim 1, wherein the software framework is a JavaScript program.

12. The method of claim 1, wherein the software framework is a VBScript program.

13. The method of claim 1, wherein the software framework is a Java program.

14. The method of claim 1, wherein the software framework is loaded into the browser from a web server.

15. The method of claim 1, wherein the software framework is included in the browser-based application.

16. The method of claim 1, wherein the software framework is included in the browser.

17. The method of claim 1, wherein a user interaction that can be handled locally comprises a user interaction that can be handled without accessing a resource at a remote computer system.

18. The method of claim 1, wherein the remote computer system is a web server in communication with the local computer system by an Internet connection.

19. A computer-implemented method for recording user interaction with a browser-based application, the method comprising:
   detecting in a software framework executing in a browser at a local computer system that a user has initiated an interaction with a browser-based application executing in the browser;
   processing the user interaction in the software framework, including handling the user interaction locally or sending a request to a remote server if required for processing;
   creating at the software framework a data item representative of the user interaction, wherein the data item includes information on whether the user interaction can be handled locally or if sending a request to the remote server is required; and
   recording the data item at a data store.

20. The method of claim 19, further comprising:
repeating the detecting, creating and recording steps for each user interaction with the browser-based application during a user-delineated session.

21. The method of claim 20, further comprising:
retrieving data items from the data store representative of the user interactions with the browser-based application during the user-delineated session; and
processing ihe data items at the software framework to replay the user interactions with the browser-based application during the user-delineated session.

22. A computer-implemented method for recording user interaction with a browser-based application, the method comprising:
detecting in a software framework executing in a browser at a local computer system that a user has initiated an interaction with a browser-based application executing in the browser;
creating at the software framework one or more data items representative of the user interaction, wherein the data items are described using a hierarchical notation; and
recording the one or more data items at a data store.

23. The method of claim 22, wherein the data item representative of the user interaction comprises an object-event pair.

24. The method of claim 22, wherein the data item is descriptive of the user's interaction with the browser-based application in the browser, such that a data stream resulting from the user interaction at a browser level and at a remote server level is captured by the data item.

25. The method of claim 22, further comprising:
retrieving the one or more data items from the data store; and
processing the one or more data items at the software framework to replay the user interaction with the browser-based application represented by the data item.

26. The method of claim 25, wherein replaying the user interaction with the browser-based application includes, for each data item retrieved from the data store:
determining from information included in the data item whether the data item can be handled locally or requires a request to a remote server for processing; and
processing the data item according to a result of the determination.

27. A computer-implemented method for listening to a user interaction with a browser-based application, the method comprising:
detecting in a software framework executing at a first computer system that a user has initiated an interaction with a browser-based application executing in a browser;
processing the user interaction at the software framework;
creating at the software framework one or more data items representative of the user interaction, wherein the data items are described using a hierarchical notation;
recording the data items at a data store accessible by the first computer system and by a second computer system on which another instance of the browser-based application is executing in a browser;
retrieving the data items from the data store; and
processing the data items at a software framework executing in the browser at the second computer system to listen at the second computer system to the user interaction with the browser-based application at the first computer system.

28. The method of claim 27, wherein retrieving the data items from the data store comprises:
periodically polling the data store for one or more data items not previously retrieved by the second computer system and retrieving from the data store such data items.

29. The method of claim 27, wherein the second computer system maintains a connection to the data store, such that the second computer system retrieves a data item from the data store as soon as the data item is received at the data store from the first computer system.

30. The method of claim 27, wherein:
the user of the first computer system is a customer and a user of the second computer system is a customer support worker for the browser-based application, such that the customer support worker can listen to the customer's interaction with the browser-based application to provide customer support to the customer.

31. A computer-implemented method for simulating user interaction with a browser-based application, the method comprising:
receiving a plurality of data items representative of user interactions with a browser-based application;
processing the data items using a software framework, such that the user interactions with the browser-based application represented by the data items are simulated, where processing the data items using the software framework includes:
determining whether a user interaction represented by a data item can be handled locally or requires access to a resource at a remote computer system, wherein the data item includes information on whether the user interaction can be handled locally or if sending a request to the remote computer system is required, and
processing the user interaction based on a result of the determination.

32. The method of claim 31, wherein:
the plurality of data items are included in a batch input file;
the browser-based application is an application for loading data extracted from a first system into a second system; and
processing the data items using the software framework, loads the data extracted from the first system into the second system.

33. The method of claim 31, wherein the plurality of data items are received by a customer support worker for the browser-based application, the method further comprising:
providing customer support for the browser-based application based on the simulated user interactions with the browser-based application.

34. A system for processing a user interaction with a browser-based application, the system comprising:
a client computer including:
a browser executing on the client computer;
a browser-based application executing in the browser; and
a software framework executing in the browser, configured to:
detect a user interaction with the browser-based application;
determine whether the user interaction can be processed locally or requires access to a resource accessible by the server system;
process the user interaction based on a result of the determination, including one or both of handling the user interaction locally at the software framework and sending a request to the server system;

the client computer configured to send transmissions to and receive transmissions from a server system;
a server system configured to:
process a user interaction received from the software framework executing on the client computer; and
a data store accessible by the client computer, wherein the software framework is further configured to:
create at least one data item representative of a user interaction with the browser-based application, wherein the data item includes the result of the determination; and
store the data item at the data store.

35. The system of claim 34, wherein:
a user interaction that can be handled locally comprises a user interaction that does not require access to a resource accessible by the server system for processing.

36. The system of claim 34, wherein:
the software framework is further configured to:
retrieve the data item from the data store; and
use the data item to reprocess the user interaction represented by the data item including,
determining if the user interaction represented by the data item can be handled locally or requires access to a resource at the server system, and
reprocessing the user interaction based on a result of the determination.

37. The system of claim 34, wherein the data store is further accessible by a second client computer, the system further comprising:
a second client computer including:
a second browser executing on the second client computer;
the browser-based application executing in the second browser; and
a second software framework executing in the second browser, configured to:
receive a data item representing a user interaction with the browser-based application at the client computer;
determine whether the user interaction represented by the data item can be processed locally or requires access to a resource accessible by the server system;
process the user interaction based on a result of the determination, including one or both of handling the user interaction locally at the second software framework and sending a request to the server system;
the second client computer configured to send transmissions to and receive transmissions from the server system.

38. The system of claim 37, wherein the second software framework is further configured to:
periodically poll the data store for one or more data items not previously retrieved by the second software framework and retrieve such data items from the data store.

39. The system of claim 37, wherein the second software framework is further configured to:
cause the second client computer to maintain a connection to the data store, such that the second software framework retrieves a data item from the data store as soon as the data item is received at the data store from the client computer.

40. The system of claim 37, wherein the second software framework is a JavaScript program.

41. The system of claim 37, wherein the second software framework is a VBScript program.

42. The system of claim 37, wherein the second software framework is a Java program.

43. The system of claim 34, wherein the data store is a database.

44. The system of claim 34, wherein the data item includes a sequence of one or more object-event pairs.

45. The system of claim 34, wherein the software framework is a JavaScript program.

46. The system of claim 34, wherein the software framework is a VBScript program.

47. The system of claim 34, wherein the software framework is a Java program.

48. A system for recording user interaction with a browser-based application, the system comprising:
a client computer including:
a browser executing on the client computer;
a browser-based application executing in the browser; and
a software framework executing in the browser, configured to:
detect a user interaction with the browser-based application;
process the user interaction, including handling the user interaction locally or sending a request to a remote server if required;
create a data item representative of the user interaction, wherein the data item includes information on whether the user interaction can be handled locally or if sending a request to the remote server is required; and
record the data item at a data store;
a data store for recording data items.

49. The system of claim 48, wherein the software framework is further configured to:
repeat detecting a user interaction, processing a user interaction, creating a data item representative of the user interaction and recording the data item for each user interaction with the browser-based application during a user-delineated session.

50. The system of claim 49, wherein the software framework is further configured to:
retrieve data items from the data store representative of the user interactions with the browser-based application during the user-delineated session; and
process the user interactions represented by the data items to replay the user interactions with the browser-based application during the user-delineated session.

51. The system of claim 48, wherein the software framework is a Java program.

52. The system of claim 48, wherein the software framework is a JavaScript program.

53. The system of claim 48, wherein the software framework is a VBScript program.

54. The system of claim 48, wherein the data item includes a sequence of one or more object-event pairs.

55. A system for listening to a user interaction with a browser-based application, the system comprising:
a first client computer including:
a first browser executing on the first client computer;
a browser-based application executing in the first browser; and
a first software framework executing in the browser, configured to:
detect a user interaction with the browser-based application;

determine whether the user interaction can be handled locally or requires access to a resource accessible by the server system;

process the user interaction based on a result of the determination, including one or both of handling the user interaction locally at the software framework and sending a request to the server system; and create a data item representative of the user interaction, wherein the data item includes the result of the determination;

a data store for storing data items that is accessible by the first client computer and a second client computer; and a second client computer including:

a second browser executing on the second client computer;

the browser-based application executing in the second browser; and a second software framework executing in the second browser, configured to:

receive a data item representing a user interaction with the browser-based application at the first client computer;

determine whether the user interaction represented by the data item can be handled locally or requires access to a resource accessible by a server system;

process the user interaction based on a result of the determination, including one or both of handling the user interaction locally at the second software framework and sending a request to a server system.

56. The system of claim 55, wherein the second software framework is further configured to:

periodically poll the data store for one or more data items not previously retrieved by the second software framework and retrieve such data items from the data store.

57. The system of claim 55, wherein the second software framework is further configured to:

cause the second client computer to maintain a connection to the data store, such that the second software framework retrieves a data item from the data store as soon as the data item is received at the data store from the first client computer.

58. The system of claim 55, wherein:

a user of the browser-based application at the first client computer is a customer; and a user of the second client computer is a customer support worker for the browser-based application, such that the customer support worker can listen to the customer's interaction with the browser-based application to provide customer support to the customer.

59. A system for recording user interaction with a browser-based application, the system comprising:

a client computer including:

a browser executing on the client computer;

a browser-based application executing in the browser; and a software framework executing in the browser, configured to:

detect a user interaction with the browser-based application;

create a data item representative of the user interaction, wherein the data item is described using a hierarchical notation; and record the data item at a data store;

a data store for recording data items.

60. The system of claim 59, wherein the data item representative of the user interaction comprises an object-event pair.

61. The system of claim 59, wherein the data item is descriptive of the user's interaction with the browser-based application in the browser, such that a data stream resulting from the user interaction at a browser level and at a remote server level is captured by the data item.

62. The system of claim 59, wherein the software framework is further configured to:

retrieve a data item from the data store; and process data item at the software framework to replay the user interaction with the browser-based application.

63. A computer program product, tangibly stored on a machine-readable medium, comprising instructions operable to cause a programmable processor to perform operations comprising:

detecting a user interaction with a browser-based application executing in a browser at a local computer system;

processing the user interaction, including:

determining whether the user interaction can be handled locally or requires access to a resource at a remote computer system, and processing the user interaction based on a result of the determination;

creating at least one data item representative of a user interaction with the browser-based application, wherein the data item includes the result of the determination; and storing the data item at the data store.

64. The computer program product of claim 63, wherein processing the user interaction based on a result of the determination includes one or both of:

handling the user interaction locally at the local computer system, and sending a request to the remote computer system to handle the user interaction.

65. The computer program product of claim 63, further comprising instructions operable to cause a programmable processor to perform operations comprising:

retrieving the data item from the data store; and using the retrieved data item to reprocess the user interaction represented by the data item, including, determining if the user interaction represented by the data item can be handled locally or requires access to a resource at a remote computer system, and reprocessing the user interaction based on a result of the determination.

66. The computer program product of claim 65, further comprising instructions operable to cause a programmable processor to perform operations comprising:

periodically polling the data store for one or more data items not previously retrieved and retrieving from the data store such data items.

67. The computer program product of claim 65, further comprising instructions operable to cause a programmable processor to perform operations comprising:

maintaining a connection to the data store, such that a data item is retrieved from the data store as soon as the data item is received at the data store.

68. The computer program product of claim 65, wherein a data item includes a sequence of one or more object-event pairs.

69. A computer program product, tangibly stored on a machine-readable medium, comprising instructions operable to cause a programmable processor to perform operations comprising:
- detecting in a browser at a local computer system that a user has initiated an interaction with a browser-based application executing in the browser;
- processing the user interaction, including handling the user interaction locally or sending a request to a remote server if required for processing;
- creating a data item representative of the user interaction, wherein the data item includes information on whether the user interaction can be handled locally or if sending a request to the remote server is required; and
- recording the data item at a data store.

70. The computer program product of claim 69, further comprising instructions operable to cause a programmable processor to perform operations comprising:
- repeating the detecting, creating and recording steps for each user interaction with the browser-based application during a user-delineated session.

71. The computer program product of claim 70, further comprising instructions operable to cause a programmable processor to perform operations comprising:
- retrieving data items from the data store representative of the user interactions with the browser-based application during the user-delineated session; and
- processing the data items to replay the user interactions with the browser-based application during the user-delineated session.

72. A computer program product, tangibly stored on a machine-readable medium, comprising instructions operable to cause a programmable processor to perform operations comprising:
- detecting in a browser at a local computer system that a user has initiated an interaction with a browser-based application executing in the browser;
- creating one or more data items representative of the user interaction, wherein the data items are described using a hierarchical notation; and
- recording the one or more data items at a data store.

73. The computer program product of claim 72, wherein the data item representative of the user interaction comprises an object-event pair.

74. The computer program product of claim 72, wherein the data item is descriptive of the user's interaction with the browser-based application in the browser, such that a data stream resulting from the user interaction at a browser level and at a remote server level is captured by the data item.

75. The computer program product of claim 72, further comprising instructions operable to cause a programmable processor to perform operations comprising:
- retrieving the one or more data items from the data store; and
- processing the one or more data items to replay the user interaction with the browser-based application.

76. The computer program product of claim 75, wherein replaying the user interaction with the browser-based application includes, for each data item retrieved from the data store:
- determining whether the data item can be handled locally or requires a request to a remote server for processing; and
- processing the data item according to a result of the determination.

77. A computer program product, tangibly stored on a machine-readable medium, comprising instructions operable to cause a programmable processor to perform operations comprising:
- receiving a plurality of data items representative of user interactions with a browser-based application;
- processing the data items, such that the user interactions with the browser-based application represented by the data items are simulated, where processing the data items includes:
  - determining whether a user interaction represented by a data item can be handled locally or requires access to a resource at a remote computer system, and
  - processing the user interaction based on a result of the determination;
- creating at least one data item representative of a user interaction with the browser-based application, wherein the data item includes the result of the determination; and
- storing the data item at the data store.

78. The computer program product of claim 77, wherein:
- the plurality of data items are included in a batch input file;
- the browser-based application is an application for loading data extracted from a first system into a second system; and
- processing the data items, loads the data extracted from the first system into the second system.

* * * * *